(12) United States Patent
Lv et al.

(10) Patent No.: US 10,819,123 B2
(45) Date of Patent: Oct. 27, 2020

(54) VOLTAGE COLLECTION CIRCUIT AND CIRCUIT CONTROL METHOD

(71) Applicant: HUAWEI TECHNOLOGIES CO., LTD., Shenzhen, Guangdong (CN)

(72) Inventors: Yang Lv, Shenzhen (CN); Wencheng Wang, Shenzhen (CN); Zhijie Wang, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 295 days.

(21) Appl. No.: 15/948,612

(22) Filed: Apr. 9, 2018

(65) Prior Publication Data
US 2018/0226814 A1 Aug. 9, 2018

Related U.S. Application Data

(63) Continuation of application No. PCT/CN2016/102407, filed on Oct. 18, 2016.

(30) Foreign Application Priority Data

Apr. 29, 2016 (CN) .......................... 2016 1 0289360

(51) Int. Cl.
*H01M 10/44* (2006.01)
*H01M 10/46* (2006.01)
(Continued)

(52) U.S. Cl.
CPC ............ *H02J 7/0021* (2013.01); *B60L 50/64* (2019.02); *H01M 10/441* (2013.01); *H02J 7/00* (2013.01);
(Continued)

(58) Field of Classification Search
CPC ...... H02J 7/0052; H02J 7/0021; H02J 7/0013; H02J 7/1423; H02J 7/0014
(Continued)

(56) References Cited

U.S. PATENT DOCUMENTS 5,998,967 A 12/1999 Umeki et al.
2008/0197805 A1 8/2008 Pellenc
(Continued)

FOREIGN PATENT DOCUMENTS

CN 101103487 A 1/2008
CN 202084959 U 12/2011
(Continued)

*Primary Examiner* — Edward Tso
(74) *Attorney, Agent, or Firm* — Womble Bond Dickinson (US) LLP (57) ABSTRACT

Embodiments of the present disclosure provide a voltage collection circuit and a circuit control method. The voltage collection circuit includes a battery monitoring chip, n switch units, and a controller. The battery monitoring chip is connected to a battery module including k battery cells, a battery cell CELL(i) is any one of the k battery cells. A switch unit Ji is connected in parallel to the battery cell CELL(i), a switch unit Js is connected in parallel to voltage collection channels Cs and C(s−1). The battery monitoring chip is configured to collect voltages of the k battery cells by using n+1 voltage collection channels. The controller is connected to the battery monitoring chip and control ends of the n switch units and configured to control working statuses of the n switch units according to the voltages collected by using the n+1 voltage collection channels.

9 Claims, 5 Drawing Sheets

(51) Int. Cl.
*H02J 7/00* (2006.01)
*B60L 50/64* (2019.01)

(52) U.S. Cl.
CPC ......... *H02J 7/0016* (2013.01); *Y02T 10/7005* (2013.01)

(58) Field of Classification Search
USPC ................. 320/107, 116, 117, 118, 119, 132
See application file for complete search history.

(56) References Cited

U.S. PATENT DOCUMENTS

| | | | |
|---|---|---|---|
| 2012/0086399 A1* | 4/2012 | Choi | H02J 7/0016 |
| | | | 320/116 |
| 2014/0132217 A1 | 5/2014 | Kim | |
| 2014/0184161 A1 | 7/2014 | Deal et al. | |
| 2014/0285936 A1 | 9/2014 | Garbacik et al. | |
| 2015/0137824 A1 | 5/2015 | Nishihara et al. | |
| 2015/0336459 A1 | 11/2015 | Nakamoto et al. | |
| 2016/0105042 A1 | 4/2016 | Taylor et al. | |
| 2016/0241054 A1* | 8/2016 | Matsumoto | B60L 3/0046 |
| 2018/0048165 A1* | 2/2018 | Shiraishi | H01M 10/482 |

FOREIGN PATENT DOCUMENTS

| | | |
|---|---|---|
| CN | 202231461 U | 5/2012 |
| CN | 202633971 U | 12/2012 |
| CN | 103723098 A | 4/2014 |
| WO | 2013024541 A1 | 2/2013 |
| WO | 2014024452 A1 | 2/2014 |

\* cited by examiner

VOLTAGE COLLECTION CIRCUIT AND CIRCUIT CONTROL METHOD

CROSS-REFERENCE TO RELATED APPLICATIONS

This application is a continuation of International Application No. PCT/CN2016/102407, filed on Oct. 18, 2016, which claims priority to Chinese Patent Application No. 201610289360.7, filed on Apr. 29, 2016. The disclosures of the aforementioned applications are hereby incorporated by reference in their entireties.

TECHNICAL FIELD

The present disclosure relates to the field of electronic technologies, and in particular, to a voltage collection circuit and a circuit control method.

BACKGROUND

Owing to their high energy density, lithium-ion batteries are widely applied in battery systems in the fields of environmental protection, energy storage, and electric vehicles. However, strict usage restrictions have to apply to such batteries to ensure safety. A hardware circuit is required to collect data such as a voltage of each battery cell so as to monitor each battery cell in real time to check whether the usage restrictions are exceeded.

At present, a dedicated battery monitoring chip is used mostly to collect data such as a voltage and a temperature of a battery cell. However, within different systems, voltage platforms are different, and structures and arrangements of battery modules are different. Therefore, quantities of battery cells included in all battery modules may not be exactly the same. That is, quantities of battery cells whose data needs to be collected by different battery monitoring chips may be different. Whereas different hardware circuits may be designed for battery modules with different quantities of battery cells, there is no uniform hardware circuit used to collect voltage statuses of the battery modules as a result. This increases system costs and implementation complexity.

SUMMARY

Embodiments of the present disclosure provide a voltage collection circuit and a circuit control method, so as to provide a voltage collection circuit with high adaptability and high compatibility to reduce system costs and implementation complexity of voltage collection.

A first aspect of the embodiments of the present disclosure provides a voltage collection circuit, including a battery monitoring chip, n switch units, and a controller, where the battery monitoring chip includes n+1 voltage collection channels, and a battery module includes k battery cells.

The battery monitoring chip is connected to the battery module. The battery module includes k battery cells. A battery cell CELL(i) is any one of the k battery cells, k is a positive integer less than or equal to n, and i is a positive integer less than or equal to k.

A switch unit Ji is connected in parallel to the battery cell CELL(i), where the switch unit Ji is any one of the n switch units.

A switch unit Js is connected in parallel to voltage collection channels Cs and C(s−1), where the switch unit Js is any one of the n switch units, the voltage collection channels Cs and C(s−1) are two adjacent voltage collection channels of n+1 voltage collection channels of the battery monitoring chip, and s is a positive integer less than or equal to n.

The battery monitoring chip is configured to collect voltages of the k battery cells by using the n+1 voltage collection channels.

The controller is connected to the battery monitoring chip and control ends of the n switch units and configured to control working statuses of the n switch units according to the voltages collected by using the n+1 voltage collection channels. In this way, a voltage collection circuit with high adaptability and high compatibility can be provided so as to reduce system costs and implementation complexity of voltage collection.

Optionally, the switch unit may be a combination of a diode and a relay, the relay being connected in parallel to the diode, and a control end of the relay is connected to the controller. In a default working status of the switch unit, a conduction direction of the diode is opposite a discharge current direction of the battery cell, so as to prevent the battery cell from discharging through the switch unit.

The controller is configured to: when a voltage collected by a target voltage collection channel of the battery monitoring chip is less than or equal to a preset voltage threshold, control a relay of a switch unit that corresponds to the target voltage collection channel to short-circuit a diode of a switch unit that corresponds to the target voltage collection channel, so as to ensure that a supply voltage of the battery monitoring chip is the highest voltage provided by the battery module, and further ensure voltage collection accuracy of the battery monitoring chip.

Optionally, the switch unit may be a combination of a diode and an optical Metal Oxide Semiconductor (MOS), the optical MOS is connected in parallel to the diode, and a control end of the optical MOS is connected to the controller. In a default working status of the switch unit, a conduction direction of the diode is opposite a discharge current direction of the battery cell, so as to prevent the battery cell from discharging through the switch unit.

The controller is configured to: when a voltage collected by a target voltage collection channel of the battery monitoring chip is less than or equal to a preset voltage threshold, control an optical MOS of a switch unit that corresponds to the target voltage collection channel to short-circuit a diode of a switch unit that corresponds to the target voltage collection channel, so as to ensure that a supply voltage of the battery monitoring chip is the highest voltage provided by the battery module, and further ensure voltage collection accuracy of the battery monitoring chip.

Optionally, the switch unit may be an N-channel MOS, and the N-channel MOS is connected to the controller. In a default working status of the switch unit, a conduction direction of a body diode of the N-channel MOS is opposite a discharge current direction of the battery cell, so as to prevent the battery cell from discharging through the switch unit.

The controller is configured to: when a voltage collected by a target voltage collection channel of the battery monitoring chip is less than or equal to a preset voltage threshold, control an N-channel MOS of a switch unit that corresponds to the target voltage collection channel to short-circuit a body diode of a switch unit that corresponds to the target voltage collection channel, so as to ensure that a supply voltage of the battery monitoring chip is the highest voltage provided by the battery module, and further ensure voltage collection accuracy of the battery monitoring chip.

Optionally, the switch unit may be a P-channel MOS, and the P-channel MOS is connected to the controller. In a default working status of the switch unit, a conduction direction of a body diode of the P-channel MOS is opposite a discharge current direction of the battery cell, so as to prevent the battery cell from discharging through the switch unit.

The controller is configured to: when a voltage collected by a target voltage collection channel of the battery monitoring chip is less than or equal to a preset voltage threshold, control a P-channel MOS of a switch unit that corresponds to the target voltage collection channel to short-circuit a body diode of a switch unit that corresponds to the target voltage collection channel, so as to ensure that a supply voltage of the battery monitoring chip is the highest voltage provided by the battery module, and further ensure voltage collection accuracy of the battery monitoring chip.

Optionally, the controller and the n switch units are connected directly (including a direct connection manner by using a communications bus) or connected by using a conversion chip (for example, a serial-to-parallel chip).

A second aspect of the embodiments of the present disclosure provides a circuit control method, where the method is applied to a voltage collection circuit, the voltage collection circuit includes a battery monitoring chip, n switch units, and a controller, and the method includes:

obtaining, by the controller, voltages that are of k battery cells included in the battery module and that are collected by the battery monitoring chip by using n+1 voltage collection channels; and controlling, by the controller, working statuses of the n switch units according to the voltages collected by using the n+1 voltage collection channels. In this way, a voltage collection circuit with high adaptability and high compatibility can be provided so as to reduce system costs and implementation complexity of voltage collection.

Optionally, the switch unit may be a combination of a diode and a relay, the relay being connected in parallel to the diode, and a control end of the relay is connected to the controller. In a default working status of the switch unit, a conduction direction of the diode is opposite a discharge current direction of the battery cell, so as to prevent the battery cell from discharging through the switch unit.

Optionally, the controlling, by the controller, working statuses of the n switch units according to the voltages collected by using the n+1 voltage collection channels is specifically:

determining, by the controller, whether the voltages collected by using the n+1 voltage collection channels are less than or equal to a preset voltage threshold; and when a target voltage collection channel where a voltage collected is less than or equal to the preset voltage threshold is determined, controlling, by the controller, a relay of a switch unit that corresponds to the target voltage collection channel to short-circuit a diode of a switch unit that corresponds to the target voltage collection channel; or going on until it is determined that there is no target voltage collection channel where a voltage collected is less than or equal to the preset voltage threshold, so as to ensure that a supply voltage of the battery monitoring chip is the highest voltage provided by the battery module, and further ensure voltage collection accuracy of the battery monitoring chip.

Optionally, the method further includes:

when the target voltage collection channel where the voltage collected is less than or equal to the preset voltage threshold is determined, determining, by the controller, a value of k, that is, a quantity of battery cells included in the battery module, according to channel information (for example, a channel number) of the target voltage collection channel. It is assumed that the target voltage collection channels are Cn and C(n−1), and that a voltage collected by voltage collection channels C(n−1) and C(n−2) is greater than the preset voltage threshold. Then, k=n−1 may be determined.

A voltage collection circuit provided by the embodiments of the present disclosure includes a battery monitoring chip, n switch units, and a controller. The battery monitoring chip is connected to a battery module including k battery cells, a battery cell CELL(i) is any one of the k battery cells, k is less than or equal to n, and i is less than or equal to k. A switch unit Ji is connected in parallel to the battery cell CELL(i), a switch unit Js is connected in parallel to voltage collection channels Cs and C(s−1), and s is less than or equal to n. The battery monitoring chip is configured to collect voltages of the k battery cells by using n+1 voltage collection channels. The controller is connected to the battery monitoring chip and control ends of the n switch units and configured to control working statuses of the n switch units according to the voltages collected by using the n+1 voltage collection channels. In this way, a voltage collection circuit with high adaptability and high compatibility can be provided so as to reduce system costs and implementation complexity of voltage collection.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
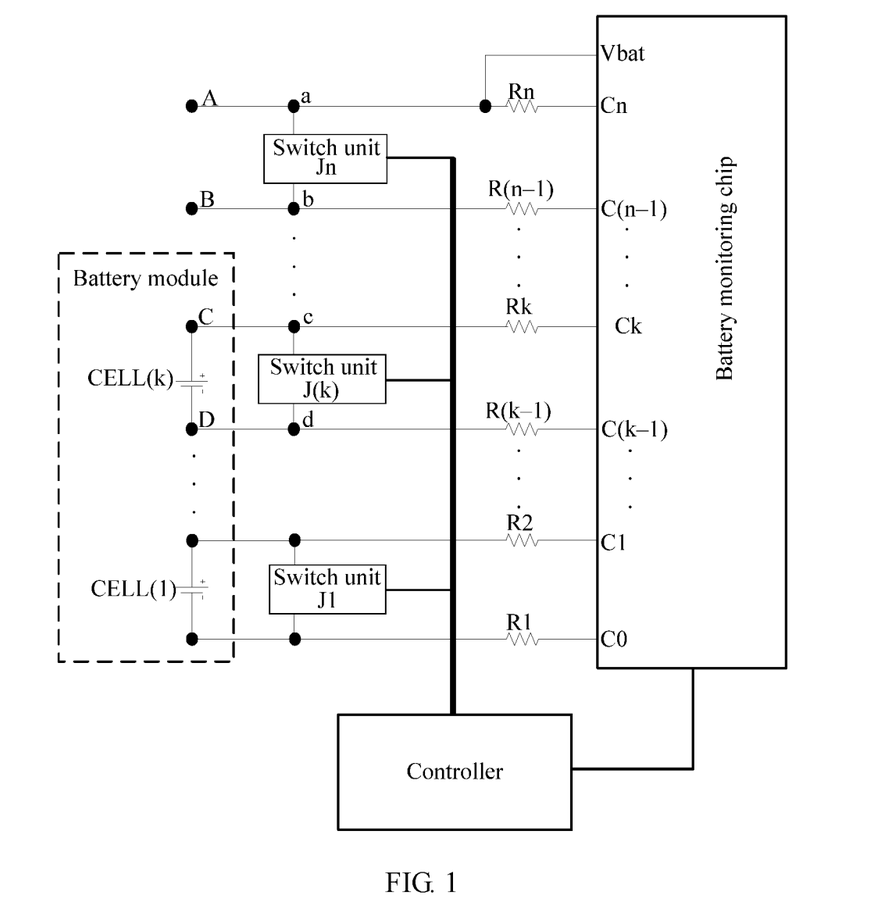
FIG. 1 is a schematic structural diagram of a voltage collection circuit according to an embodiment of the present disclosure.

Referring to FIG. 1, FIG. 1 is a schematic structural diagram of a voltage collection circuit according to an embodiment of the present disclosure. The voltage collection circuit described in this embodiment of the present disclosure includes a battery monitoring chip, n switch units, and a controller.

A battery module includes k battery cells: CELL(1), CELL(2), . . . , and CELL(k), connected in series.

The battery monitoring chip has n+1 differential input voltage collection channels: C0, C1, . . . , and Cn, and is capable of simultaneously collecting voltages of a maximum of n battery cells.

n and k are positive integers, k is less than or equal to n, n is known, and k is unknown. Preferably, a value of n may be relatively large to ensure that the battery monitoring chip can be applied to as many battery modules as possible. The battery monitoring chip may specifically be powered by the battery module.

A quantity of the multiple switch units is n and matches a quantity of voltage collection channels. That is, the switch units are J1, J2, . . . , and Jn.

Figure 2:
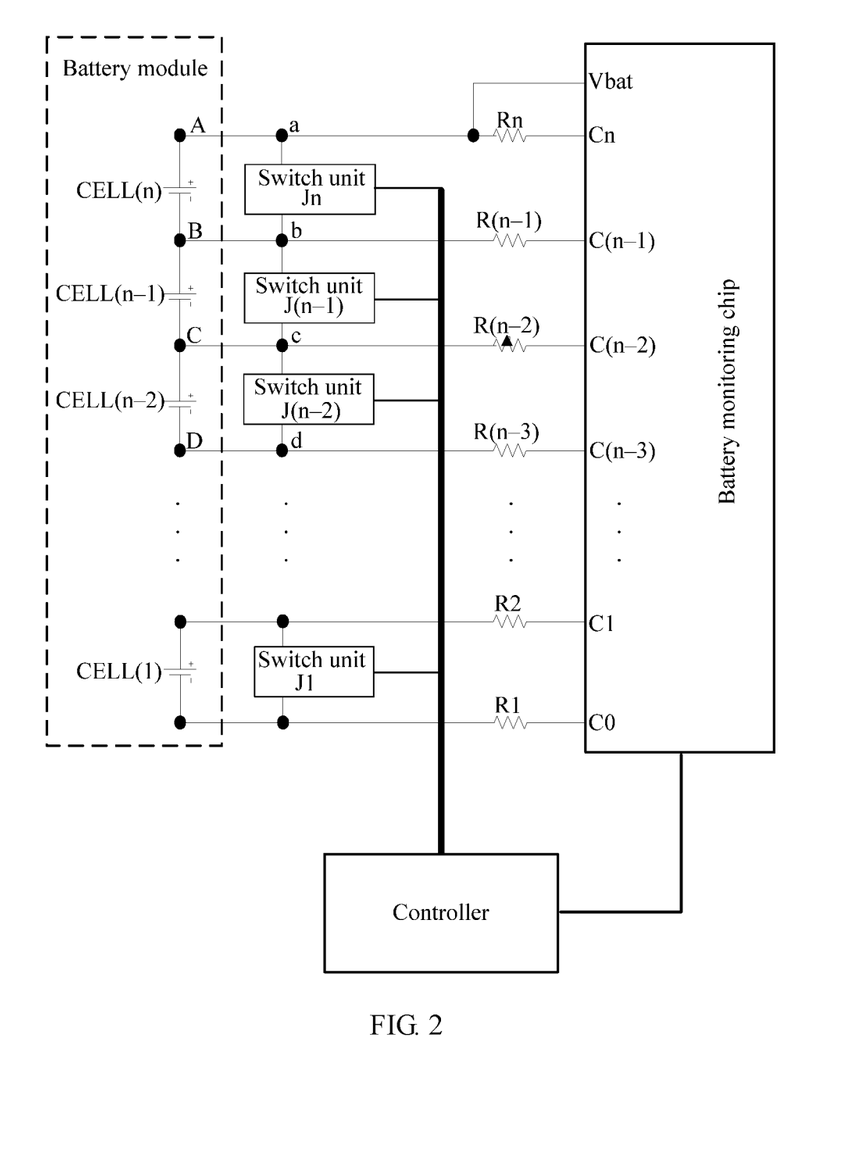
FIG. 2 is a schematic structural diagram of another voltage collection circuit according to an embodiment of the present disclosure.

Specifically, the switch unit is connected in parallel to both the battery cell and two adjacent voltage collection channels. That is, the switch unit Ji is connected in parallel to the battery cell CELL(i). The switch unit Ji is any one of the n switch units, the battery cell CELL(i) is any one of the k battery cells, and i is a positive integer less than or equal to k. A switch unit Js is connected in parallel to voltage collection channels Cs and C(s−1), the switch unit Js is any one of the n switch units, the voltage collection channels Cs and C(s−1) are two adjacent voltage collection channels of n+1 voltage collection channels, and s is a positive integer less than or equal to n. The battery monitoring chip is connected to the k battery cells included in the battery module, and is configured to collect voltages of the k battery cells by using the n+1 voltage collection channels. That is, voltage collection channels C0 and C1 are used to collect a voltage of a battery cell CELL(1), voltage collection channels C1 and C2 are used to collect a voltage of a battery cell CELL(2), . . . , and if the battery module includes n battery cells, that is, k=n, voltage collection channels C(n−1) and Cn are used to collect a voltage of a battery cell CELL(n), as shown in FIG. 2.

Preferably, a resistor may be connected in series between two terminals of a battery cell and a voltage collection channel to ensure impedance matching between the battery module and the battery monitoring chip.

In a default working status, a switch unit is equivalent to a diode and a conduction direction of the switch unit is opposite a discharge current direction of a battery cell. For example, a conduction direction of a switch unit Jk is from d to c in the default working status and there is a conduction voltage drop in a direction from d to c, while a discharge current direction of a battery cell CELL(k) connected in parallel to the switch unit Jk is from c to d. In this way, the battery cell CELL(k) can be prevented from discharging through a circuit C-c-d-D.

The battery monitoring chip is powered by the battery module. Therefore, a power-supply pin Vbat is connected to a point between a switch unit Jn and a resistor Rn. If k=n, as shown in FIG. 2, a potential of the power-supply pin Vbat is equal to a potential of the positive terminal of the battery cell CELL(n). That is, a supply voltage of the battery monitoring chip is equal to the highest voltage provided by the battery module. In this case, voltage collection accuracy of the battery monitoring chip is high enough to meet a requirement on the voltage collection accuracy.

However, when the quantity of battery cells included in the battery module is less than n, assuming that k=n−1, there is a conduction voltage drop in the switch unit Jn in a direction from b to a and the conduction voltage drop generally cannot be ignored. Therefore, in this case, the power-supply voltage of the battery monitoring chip is less than the highest voltage provided by the battery module. As a result, the voltage collection accuracy of the battery monitoring chip is reduced, and is very likely to be unable to meet the requirement on the voltage collection accuracy.

The controller is connected to the battery monitoring chip and control ends of the n switch units. The controller communicates with the battery monitoring chip to obtain n voltages collected by the n+1 voltage collection channels of the battery monitoring chip. The n voltages are compared with a preset voltage threshold (for example, 0.5 volt "V"), separately. In order to reduce time for the comparison, a voltage collected by two largest-numbered voltage collection channels, C(n−1) and Cn, may be first compared with the preset voltage threshold. If the voltage collected by the voltage collection channels C(n−1) and Cn is less than or equal to the preset voltage threshold, the controller may determine that there is no battery cell connected between the voltage collection channels C(n−1) and Cn.

The preset voltage threshold may be determined according to the conduction voltage drop of the switch unit in the default working status. This embodiment does not limit the present disclosure.

Further, the controller compares a voltage collected by voltage collection channels C(n−2) and C(n−1) with the preset voltage threshold. If the voltage collected by the voltage collection channels C(n−2) and C(n−1) is greater than the preset voltage threshold, the controller may determine that a battery cell is connected between the voltage collection channels C(n−2) and C(n−1). In this case, the controller may determine that k=n−1.

Further, because no battery cell is connected between the voltage collection channels C(n−1) and Cn, the controller may control, by using a control end of the switch unit Jn, the switch unit Jn to be equivalent to a conducting wire (or in other words, a voltage drop from b to a is very small and can be ignored). In this case, it can be considered that the supply voltage of the battery monitoring chip is equal to the highest voltage provided by the battery module, and the voltage collection accuracy of the battery monitoring chip is high.

It should be noted that the controller and the control ends of the n switch units may be connected in a direct manner, including that a control end of one switch unit corresponds to one control pin of the controller or that the control ends of the n switch units are connected to one control pin of the controller by using a communications bus (as shown in FIG. 1 or FIG. 2); or may be connected by using a conversion chip (for example, a serial-to-parallel chip), that is, one control pin of the controller can control the control ends of the n switch units. This embodiment does not limit the present disclosure.

Figure 3:
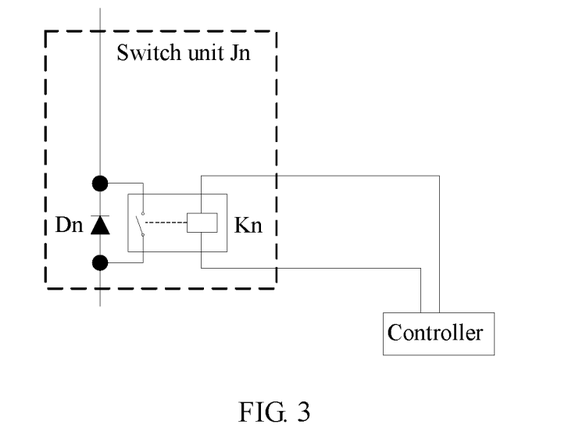
FIG. 3 is a schematic structural diagram of a switch unit according to an embodiment of the present disclosure.

The switch unit may use an internal structure shown in FIG. 3, that is, a combination of a diode and a relay. For example, the switch unit Jn includes a diode Dn and a relay Kn, the relay Kn is connected in parallel to the diode Dn, a control end of the relay Kn is connected to the controller. The controller uses the control end of the relay Kn to control the switch to be closed so as to short-circuit the diode Dn. In this case, the switch unit Jn is equivalent to a conducting wire.

Figure 4:
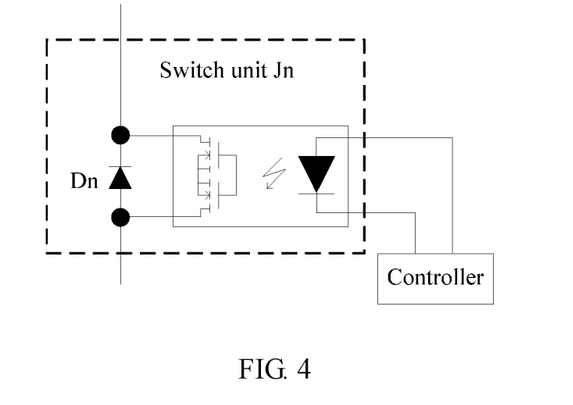
FIG. 4 is a schematic structural diagram of another switch unit according to an embodiment of the present disclosure.

In some feasible implementations, the switch unit may alternatively use an internal structure shown in FIG. 4, that is, a combination of a diode and an optical Metal Oxide Semiconductor (Metal Oxide Semiconductor, MOS). For example, the switch unit Jn includes a diode Dn and an optical MOS, the optical MOS is connected in parallel to the diode Dn, and a control end of the optical MOS is connected to the controller. The controller turns on the optical MOS by lighting a light emitting diode of the optical MOS so as to short-circuit the diode Dn. In this case, a conduction voltage drop of the optical MOS is very small, and the switch unit Jn can be considered as a conducting wire.

Figure 5:
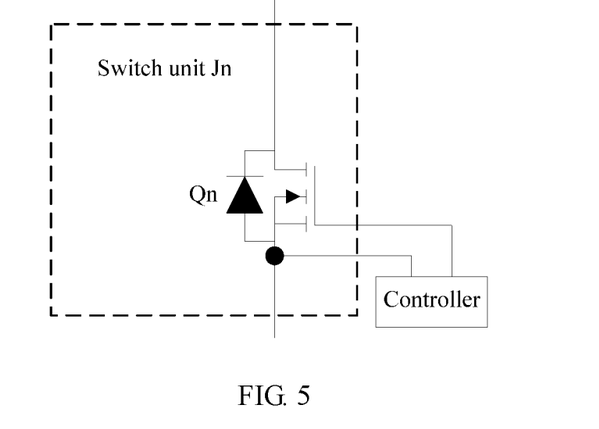
FIG. 5 is a schematic structural diagram of still another switch unit according to an embodiment of the present disclosure.

In some feasible implementations, the switch unit may alternatively use an internal structure (that is, an N-channel MOS) shown in FIG. 5. For example, the switch unit Jn includes the N-channel MOS, a control end of the N-channel MOS being connected to the controller, and a default working status of the switch unit Jn is that a conduction direction of a body diode Qn of the N-channel MOS is opposite a discharge current direction of the battery cell CELL(n). The controller short-circuits the body diode Qn by controlling the N-channel MOS. In this case, a conduction voltage drop of the N-channel MOS is very small, and the switch unit Jn can be considered as a conducting wire.

Figure 6:
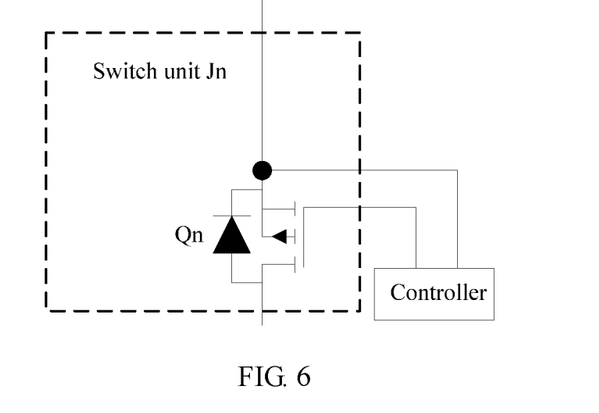
FIG. 6 is a schematic structural diagram of yet another switch unit according to an embodiment of the present disclosure.

In some feasible implementations, the switch unit may alternatively use an internal structure (that is, a P-channel MOS) shown in FIG. 6. For example, the switch unit Jn includes the P-channel MOS, a control end of the P-channel MOS being connected to the controller, and a default working status of the switch unit Jn is that a conduction direction of a body diode Qn of the P-channel MOS is opposite a discharge current direction of the battery cell CELL(n). The controller short-circuits the body diode Qn by controlling the P-channel MOS. In this case, a conduction voltage drop of the P-channel MOS is very small, and the switch unit Jn can be considered as a conducting wire.

In some feasible implementations, a quantity of the battery monitoring chips and a quantity of the controllers may both be more than one. That is, each battery monitoring chip and each controller are respectively responsible for collection of voltages of some of the battery cells in the battery module and for control of some of the switch units.

A voltage collection circuit provided by this embodiment of the present disclosure includes a battery monitoring chip, n switch units, and a controller. The battery monitoring chip is connected to a battery module including k battery cells, a battery cell CELL(i) is any one of the k battery cells, k is less than or equal to n, and i is less than or equal to k. A switch unit Ji is connected in parallel to the battery cell CELL(i), a switch unit Js is connected in parallel to voltage collection channels Cs and C(s−1), and s is less than or equal to n. The battery monitoring chip is configured to collect voltages of the k battery cells by using n+1 voltage collection channels. The controller is connected to the battery monitoring chip and control ends of the n switch units and configured to control working statuses of the n switch units according to the voltages collected by using the n+1 voltage collection channels. This voltage collection circuit may be adapted to different battery modules, with high compatibility and ensured high voltage collection accuracy. System costs and implementation complexity of voltage collection are reduced.

Figure 7:
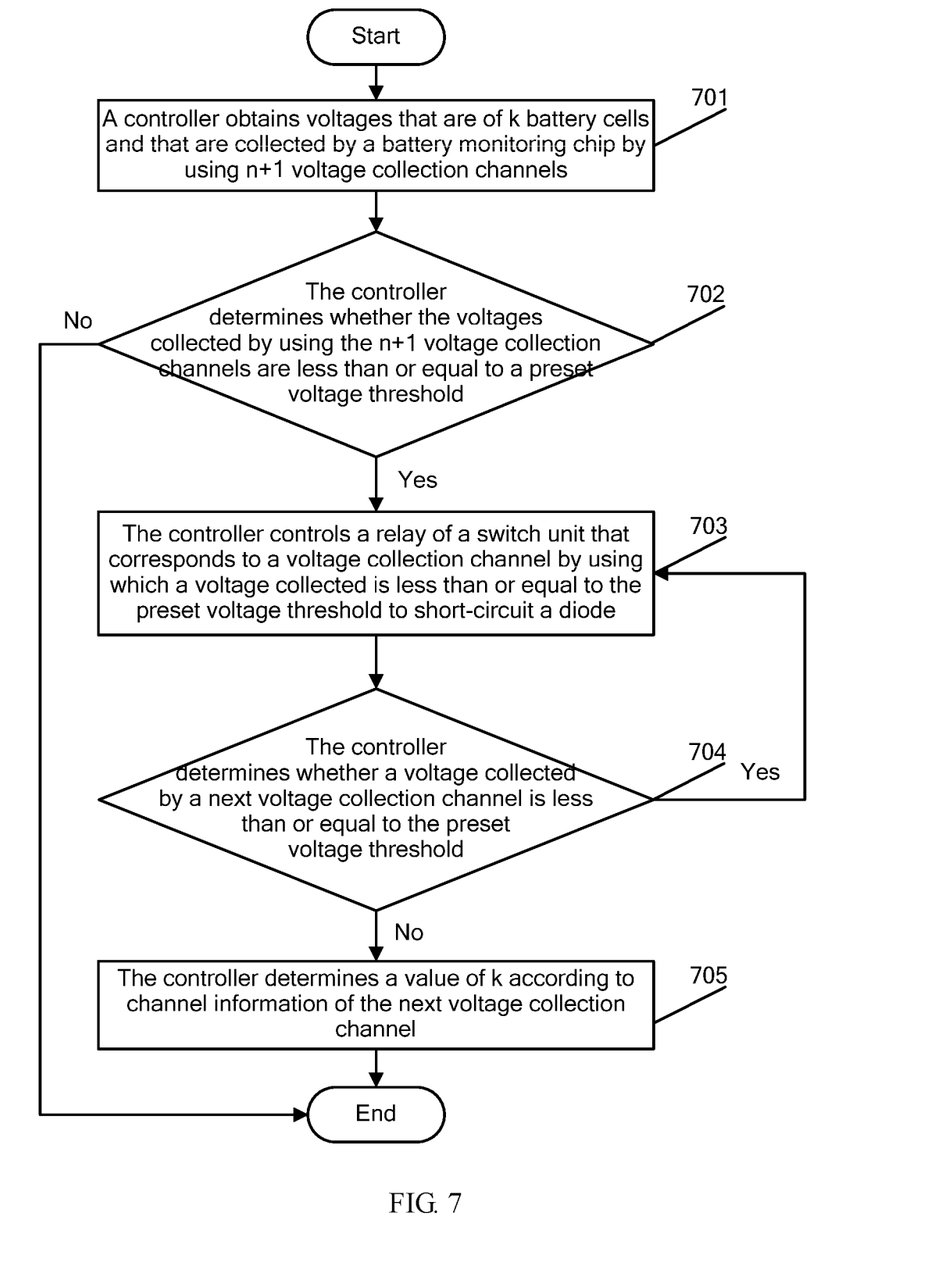
FIG. 7 is a schematic flowchart of a circuit control method according to an embodiment of the present disclosure.

Referring to FIG. 7, FIG. 7 is a schematic flowchart of a circuit control method according to an embodiment of the present disclosure based on the voltage collection circuit in FIG. 1. The circuit control method described in this embodiment uses an example in which an internal structure of a switch unit is as depicted in FIG. 3, and includes the following steps.

701: The controller obtains voltages that are of k battery cells included in a battery module and that are collected by a battery monitoring chip by using n+1 voltage collection channels.

702: The controller determines whether the voltages collected by using the n+1 voltage collection channels are less than or equal to a preset voltage threshold; and if the voltages collected by using the n+1 voltage collection channels are less than or equal to a preset voltage threshold, executes step 703; or if the voltages collected by using the n+1 voltage collection channels are not less than or equal to a preset voltage threshold, ends this process.

703: The controller controls a relay of a switch unit that corresponds to a voltage collection channel where a voltage collected is less than or equal to the preset voltage threshold to short-circuit a diode of a switch unit that corresponds to a voltage collection channel where a voltage collected is less than or equal to the preset voltage threshold.

704: The controller determines whether a voltage collected by a next voltage collection channel is less than or equal to the preset voltage threshold; and if yes, goes back to execute step 703; or if no, executes step 705.

705: The controller determines a value of k according to channel information of the next voltage collection channel.

It should be noted that the controller collects a voltage of one battery cell by using two adjacent voltage collection channels. For instance, in FIG. 1, voltage collection channels C0 and C1 collect a voltage of a battery cell CELL(1), . . . , and voltage collection channels Ck and C(k−1) collect a voltage of a battery cell CELL(k).

Preferably, the controller may compare the collected voltages with the preset voltage threshold beginning with a largest-numbered voltage collection channel. If a voltage collected by voltage collection channels C(n−1) and Cn is less than or equal to the preset voltage threshold, the controller determines that there is no battery cell connected between the voltage collection channels C(n−1) and Cn, and controls a switch of a relay Kn of a switch unit Jn to be closed to short-circuit a diode Dn. In order to determine a quantity of battery cells in the battery module, the controller compares a voltage collected by the voltage collection channel C(n−1) and a next voltage collection channel C(n−2) with the preset voltage threshold. If the voltage collected by the voltage collection channels C(n−2) and C(n−1) is greater than the preset voltage threshold, the controller determines that there is a battery cell connected between the voltage collection channels C(n−2) and C(n−1), and may determine that k=n−1 according to channel information (for example, a channel number n−2) of the next voltage collection channel C(n−2). If the voltage collected by the voltage collection channels C(n−1) and Cn is greater than the preset voltage threshold, the controller may directly determine that the quantity of battery cells in the battery module is n.

Further, if the voltage collected by the voltage collection channel C(n−1) and the next voltage collection channel C(n−2) is also less than or equal to the preset voltage threshold, the controller determines that there is no battery cell connected between the voltage collection channels C(n−2) and C(n−1), and controls a switch of a relay K(n−1) of a switch unit J(n−1) to be closed to short-circuit a diode D(n−1). In the same way, the controller further compares a voltage collected by the voltage collection channel C(n−2) and a next voltage collection channel C(n−3) with the preset voltage threshold. If the voltage collected by voltage collection channels C(n−3) and C(n−2) is greater than the preset voltage threshold, the controller determines that there is a battery cell connected between the voltage collection channels C(n-3) and C(n-2), and may determine that k=n-2 according to channel information (for example, a channel number n-3) of the next voltage collection channel C(n-3).

Further, if the voltage collected by the voltage collection channel C(n-2) and the next voltage collection channel C(n-3) is also less than or equal to the preset voltage threshold, the controller repeats actions similar to the foregoing ones until all voltage collection channels by which voltages collected are less than or equal to the preset voltage threshold are determined, controls a corresponding switch unit, and determines the value of k; or the controller repeats similar actions until it is determined that there is no voltage collection channel where a voltage collected is less than or equal to the preset voltage threshold, and determines that k=n.

In this embodiment of the present disclosure, a controller communicates with a battery monitoring chip to obtain voltages that are of k battery cells included in a battery module and that are collected by the battery monitoring chip, and determines whether the voltages collected by using the n+1 voltage collection channels are less than or equal to a preset voltage threshold; if there is a voltage collection channel where a voltage collected is less than or equal to the preset voltage threshold, the controller determines that there is no battery cell connected between corresponding voltage collection channels, and controls a relay of a switch unit that corresponds to the corresponding voltage collection channel to short-circuit a diode of a switch unit that corresponds to the corresponding voltage collection channel. The controller further determines whether a voltage collected by a next voltage collection channel is less than or equal to the preset voltage threshold, and if not, the controller may determine a value of k based on channel information of the next voltage collection channel. If yes, the controller controls a relay of a corresponding switch unit to short-circuit the diode. Controlling the voltage collection circuit based on this circuit control method may be adapted to different battery modules, with high compatibility and ensured high voltage collection accuracy. System costs and implementation complexity of voltage collection are reduced.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

In this specification, specific examples are used to describe the principle and implementations of the present disclosure, and the description of the embodiments is only intended to help understand the method and core idea of the present disclosure. In addition, a person of ordinary skill in the art may, based on the idea of the present disclosure, make modifications to the specific implementations and the application scope. Therefore, the content of this specification shall not be construed as a limitation to the present disclosure.

What is claimed is:
1. A voltage collection apparatus, comprising
    a battery monitoring chip,
    a first quantity (n) of switch units consisting switch units $J_1, J_2, \ldots,$ through $J_n$, and
    a controller, wherein the first quantity (n) is a positive integer;
    wherein the battery monitoring chip is connected to a battery module, wherein the battery module comprises a second quantity (k) of battery cells consisting of battery cells CELL(1), CELL(2), ..., through CELL(k), the second quantity (k) is a positive integer less than or equal to the first quantity (n);
    wherein switch units $J_1, J_2, \ldots,$ through $J_k$ are connected in parallel to the second quantity (k) of battery cells CELL(1), CELL(2), ..., through CELL(k), respectively, wherein one and only one switch unit is connected it parallel to each of the battery cells;
    wherein one and only one of the first quantity (n) of switch units is connected in parallel to each of n pairs of two adjacent voltage collection channels of n+1 voltage collection channels of the battery monitoring chip;
    wherein the battery monitoring chip is configured to collect voltages of the second quantity (k) of battery cells by using at least some of the n+1 voltage collection channels; and
    wherein the controller is connected to the battery monitoring chip and control ends of the first quantity (n) of switch units and configured to control working statuses of the first quantity (n) of switch units according to the voltages collected by using at least some of the n+1 voltage collection channels, and
    wherein each of at least one first switch unit of the switch units comprises a diode and a relay, the relay is connected in parallel to the diode, a control end of the relay is connected to the controller, and a default working status of each first switch unit is that a conduction direction of the diode is opposite a discharge current direction of the battery cell.

2. The apparatus according to claim 1, wherein
    the controller is configured to: when a voltage collected by using a target voltage collection channel of the battery monitoring chip is less than or equal to a preset voltage threshold, control a relay of a first switch unit that corresponds to the target voltage collection channel to short-circuit a diode of the first switch unit that corresponds to the target voltage collection channel.

3. The apparatus according to claim 1, wherein
    each of at least one second switch unit of the switch unit comprises a diode and an optical Metal Oxide Semiconductor (MOS), the optical MOS is connected in parallel to the diode, a control end of the optical MOS is connected to the controller, and a default working status of each second switch unit is that a conduction direction of the diode is opposite a discharge current direction of the battery cell; and
    the controller is configured to: when a voltage collected by a target voltage collection channel of the battery monitoring chip is less than or equal to a preset voltage threshold, control an optical MOS of a second switch unit that corresponds to the target voltage collection channel to short-circuit a diode of the second, switch unit that corresponds to the target voltage collection channel.

4. The apparatus according to claim 1, wherein
    each of at least one third switch unit of the switch units comprises an N-channel MOS, and a control end of the N-channel MOS is connected to the controller, and a default working status of each third switch unit is that a conduction direction of a body diode of the N-channel MOS is opposite a discharge current direction of the battery cell; and the controller is configured to: when a voltage collected by a target voltage collection channel of the battery monitoring chip is less than or equal to a preset voltage threshold, control an N-channel MOS of a third switch unit that corresponds to the target voltage collection channel to short-circuit a body diode of the third switch unit that corresponds to the target voltage collection channel.

5. The apparatus according to claim 1, wherein
each of at least one fourth switch unit of the switch units comprises a P-channel MOS, and a control end of the P-channel MOS is connected to the controller, and a default working status of each fourth switch unit is that a conduction direction of a body diode of the P-channel MOS is opposite a discharge current direction of the battery cell; and
the controller is configured to: when a voltage collected by a target voltage collection channel of the battery monitoring chip is less than or equal to a preset voltage threshold, control a P-channel MOS of a fourth switch unit that corresponds to the target voltage collection channel to short-circuit a body diode of the fourth switch unit that corresponds to the target voltage collection channel.

6. The apparatus according to of claim 1, wherein
the controller and the first quantity (n) of switch units are connected directly or connected by using a conversion chip.

7. A circuit control method, wherein the method is applied to a voltage collection circuit, the voltage collection circuit comprises a battery monitoring chip, a first quantity (n) of switch units, and a controller, n being a positive integer, the method comprising:
obtaining, by the controller, voltages that are of a second quantity (k) battery cells comprised in a battery module and that are collected by the battery monitoring chip by using at least some of n+1 voltage collection channels, wherein the second quantity (k) is a positive integer less than or equal to the first quantity (n); and
controlling, by the controller, working statuses of the first quantity (n) of switch units according to the voltages collected by using at least some of the n+1 voltage collection channels,
wherein each of at least one first switch unit of the switch units comprises a diode and a relay, the relay is connected in parallel to the diode, a control end of the relay is connected to the controller, and a default working status of each first switch unit is that a conduction direction of the diode is opposite a discharge current direction of the battery cell.

8. The method according to claim 7, wherein the controlling, by the controller, working statuses of the first quantity (n) of switch units according to the voltages collected by using at least some of the n+1 voltage collection channels comprises:
determining, by the controller, whether the voltages collected by using at least some of the n+1 voltage collection channels are less than or equal to a preset voltage threshold; and
when a target voltage collection channel where a voltage collected is less than or equal to the preset voltage threshold is determined, controlling, by the controller, a relay of a first switch unit that corresponds to the target voltage collection channel to short-circuit a diode of the first switch unit that corresponds to the target voltage collection channel.

9. The method according to claim 8, further comprising:
when the target voltage collection channel where the voltage collected is less than or equal to the preset voltage threshold is determined, determining, by the controller, the second quantity (k) according to channel information of the target voltage collection channel.

* * * * *